Aug. 23, 1927.
K. MARSCHEIDER
1,639,743
VALVE
Filed Nov. 15, 1924
3 Sheets-Sheet 1
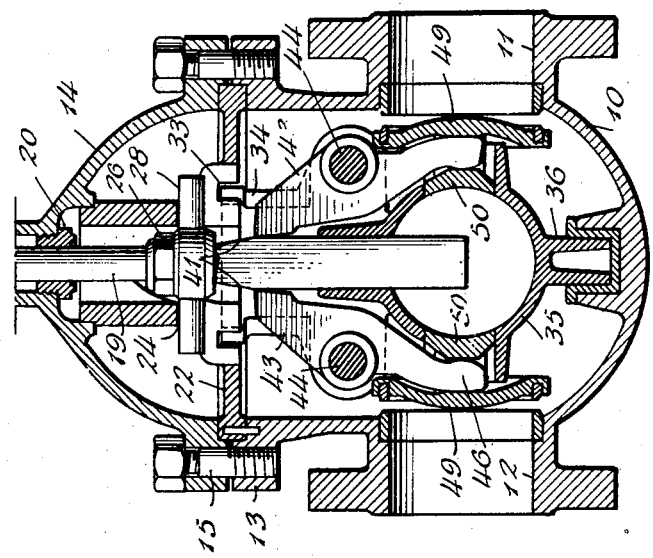
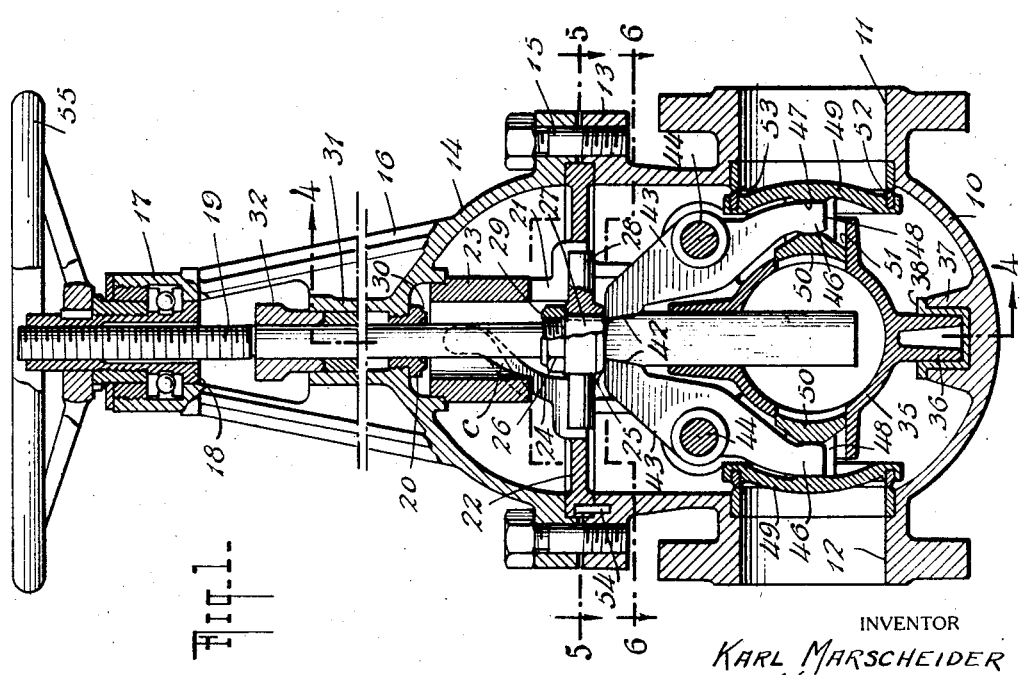
INVENTOR
KARL MARSCHEIDER
ATTORNEYS Aug. 23, 1927.  
K. MARSCHEIDER  
1,639,743  
VALVE  
Filed Nov. 15, 1924  
3 Sheets-Sheet 2
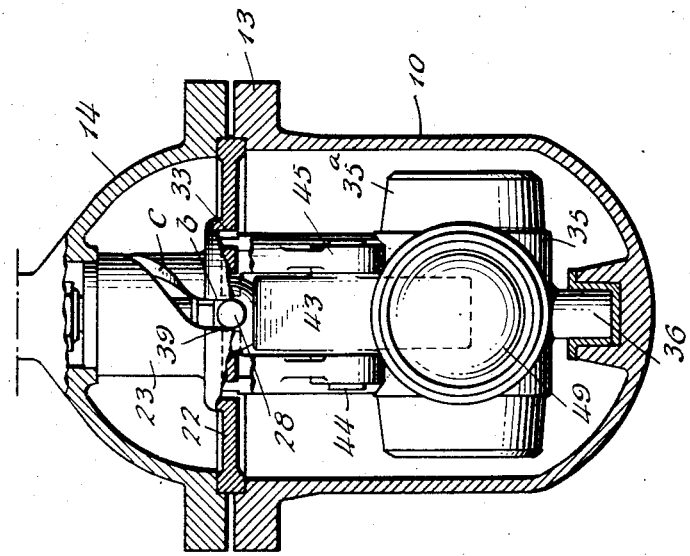
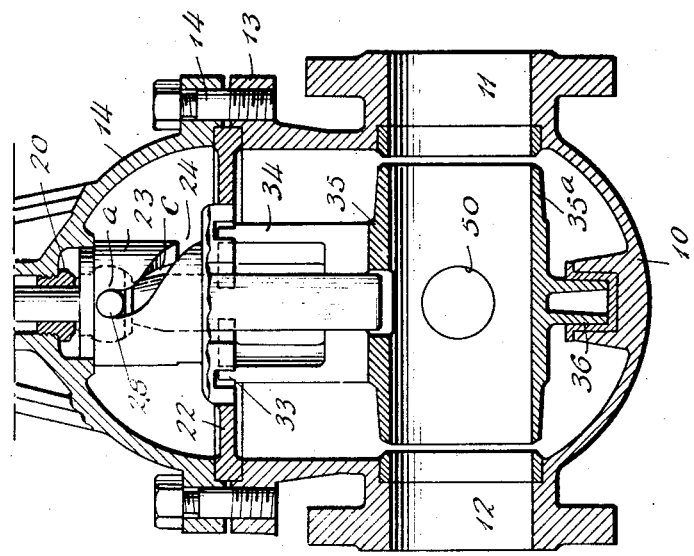
INVENTOR  
KARL MARSCHEIDER  
BY  
ATTORNEYS Aug. 23, 1927.

K. MARSCHEIDER

VALVE

Filed Nov. 15, 1924

1,639,743

3 Sheets-Sheet 3

INVENTOR
KARL MARSCHEIDER
BY
Lotha, Kehlenbeck Harley
ATTORNEYS

Patented Aug. 23, 1927.

1,639,743

UNITED STATES PATENT OFFICE.

KARL MARSCHEIDER, OF BERLIN-TEGEL, GERMANY, ASSIGNOR TO A. BORSIG G. M. B. H., OF BERLIN-TEGEL, GERMANY, A CORPORATION OF GERMANY.

VALVE.

Application filed November 15, 1924, Serial No. 750,029, and in Germany May 3, 1923.

This invention relates to valves and has for its principal object to provide a new and improved construction of a valve particularly adapted for heavy duty in large conduits through which a fluid under high pressure is passed.

A further object is to provide a valve construction which, when the valve is opened, the valve members and the operating parts thereof are located out of the path of fluid passing through the valve.

Another object is to provide a construction by means of which the valve closing parts will be positively located and held in proper alignment, not only in their closed position, but also in their opened position.

These and other objects such as reliability, ease and efficiency of operation, and durability of construction will be apparent to those skilled in the art to which this invention appertains from the following more detailed description and by reference to the accompanying drawing forming a part hereof.

Figure 6:
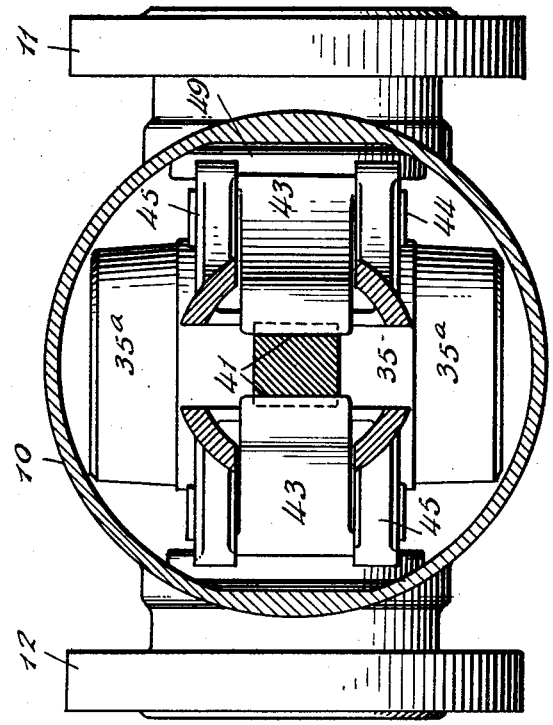
Figure 5:
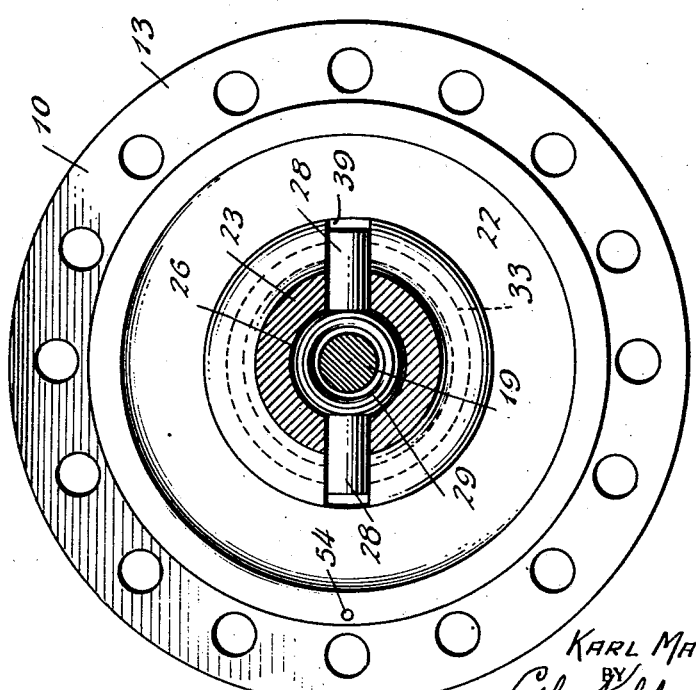

In the drawings which show an example of my invention without defining its limits, Fig. 1 is a central vertical section through a valve constructed in accordance with the principles of my invention and showing the valve in closed position; Fig. 2 is a sectional view taken on the same plane as Fig. 1 showing the valve in partially opened position; Fig. 3 is a similar view showing the valve fully opened; Fig. 4 is a central vertical section at right angles to Fig. 1 taken on the line 4—4 of Fig. 1; and Figs. 5 and 6 are sections on the line 5—5 and 6—6 of Fig. 1.

The numeral 10 indicates the valve casing which is provided with the usual flanged side openings 11 and 12, and a top flange 13 to which the bonnet 14 is secured as by the studs 15. A spider 16 preferably formed integral with the bonnet 14 is provided at its upper end with a housing 17 in which is rotatably mounted a nut 18. A spindle 19 has its upper screw threaded portion in engagement with the nut 18; the lower portion of said spindle being rotatably supported by a bearing 20 secured within the upper portion of the bonnet 14.

A cam member 21 is provided with a horizontally extending disk-like flange 22 which is clamped between the bonnet 14 and casing 10. A hollow boss 23 which projects upwardly from the center of the flange 22 has a pair of similar oppositely located cam grooves 24 formed in the side walls thereof. Each of said cam grooves has a vertically extending portion $a$ at the top thereof, a vertically extending portion $b$ at the bottom thereof, offset from the portion $a$, and a curved portion $c$ connecting said top and bottom portions.

Fixedly secured to the valve spindle 19 between a shoulder 25, (which may either be formed integral with said spindle or may be in the form of a nut secured to the spindle), and a nut 26 is a collar 27 having a pair of diametrically opposite, radially extending pins 28 which are adapted to project into the cam grooves 24. The upper face of the nut 26 is formed to provide a seat 29 which, when the spindle 19 is fully raised, co-operates with a similar seat 30 formed on the lower face of the bearing 20 to prevent leakage of the fluid from the chamber defined by the casing 10 and bonnet 14. A stuffing box 31 and gland 32 are also provided to prevent leakage of fluid past the spindle 19.

The lower face of the flange 22 is provided with an annular recess 33 arranged concentrically of the axis of the spindle 19, and an annular web 34, extending upwardly from the combined valve carrying member and conduit 35, is adapted to be slidably received in said annular recess, the recess 33 forming a bearing for the upper portion of the valve carrying member 35.

The member 35 is provided at the bottom thereof with a trunnion 36 located in axial alignment with the spindle 19 and said trunnion is rotatably mounted within the bearing 37 formed in the valve casing 10; a bushing 38 preferably being interposed between said trunnion and bearing.

The lower vertical portions $b$ of the cam grooves 24 are open at their lower extremities and the annular web 34 is provided with a pair of diametrically opposed slots 39 adapted, when the valve is placed in its closed position, to align with the open lower ends of the cam grooves 24.

The lower end of the valve spindle 19 is connected with the valve carrying member 35 by any suitable means which will permit longitudinal sliding movement of the spindle with respect to said member while preventing relative rotation of these parts. In the particular embodiment herein disclosed this means consists in providing the upper central portion of the member 35 with a rectangular shaped aperture in axial alignment with the trunnion 36; the lower end of the spindle having a similar cross-sectional configuration to that of the aperture.

Immediately adjacent to and below the shoulder 25, the valve spindle 19 is provided with a pair of tapered or wedge shaped faces 41 adapted to engage with the similarly tapered faces 42 formed on the upper ends of a pair of valve actuating levers 43. The levers 43 are pivotally mounted intermediate their ends upon the pins 44 and between the inner faces of the lugs 45 formed upon the valve carrying member 35, the pins 44 being supported within suitable apertures provided in said lugs.

The member 35 is formed with a horizontally extending cylindrical conduit 35$^a$ which is adapted when the valve is in the opened position shown in Fig. 3 to aline axially with the flanged openings 11 and 12 and furnish a through path for the fluid passing through the valve.

The lower ends of the levers 43 are provided with spherically shaped enlargements 46 which are received within correspondingly shaped sockets 47 formed in the extensions 48 projecting from the inner faces of the valve disks 49. The extensions 47 terminate at their inner extremities in the cylindrically shaped guides 50, which guides are slidably mounted within the guideways 51 projecting laterally from the member 34 and preferably formed integral therewith.

Each of the valve disks 49 is provided on its outer face with an annular seat 52, press-fitted within or otherwise suitably secured to its respective valve disk; said seats 52 being adapted to seat against the similar seats 53 received in the flanged openings 11 and 12. The seats 52 and 53, and also the seats 28 and 29 are preferably constructed of non-corrosive metal.

One or more dowel pins 54 are provided for insuring the proper location of the cam member 21 with respect to the flanged openings 11 and 12. A hand wheel 55 is secured to the nut 18 for the purpose of rotating said nut and raising or lowering the spindle 19.

*Operation.*

The manner of operation is as follows assuming the valve to be in the fully closed position shown in Figs. 1 and 4 in which position it will be noted (see Fig. 4) that the pins 28 are in engagement with the slots 39 to hold the valve member 35 against rotation, with the seats 52 of the valve disks 49 in accurate alinement with the seats 53. Rotation of the hand wheel 55 in the proper direction will, by means of the engagement of the nut 18 with the threaded portion of the spindle 19, cause said spindle to be raised. As the spindle is raised the engagement of the tapered or wedge-shaped faces 41 thereof with the co-operating faces of the levers 43 will move the upper arms of said levers outwardly and thereby withdraw the valves 49 from their closed or seated position. During this movement of the valves the pins 28 travel in the straight, vertical, lower portion $b$ of the cam grooves 24. The disengagement of the pins 28 from the slots 39 of the valve carrying member 34 does not occur until the contact between the seats 52, 53 is broken. Furthermore, the length of the vertical cam portions $b$ is such that rotation of the valve carrying member 34 cannot occur until the valve 49 has moved to the position shown in Fig. 2. After the valves 49 have been not only completely disengaged from their seats but moved therefrom a distance sufficient to allow them to clear the seats 53 and inner walls of the casing 10, the continued upward movement of the spindle 19 brings the pins 28 into the curved or inclined portions $c$ of the cam grooves, thus causing the member 35 to be rotated about the axis of the spindle; the engagement of the annular web 34 with the recess 33 and of the trunnion 36 with the bearing 37 holding the valve member 35 in proper position during its rotation. The curved cam portion $c$ produces a 90° rotation of the member 35 which brings the ends of its cylindrical conduit 35$^a$ into alignment with the flanged openings 11, 12, the pins 28 entering the straight vertically extending cam portions $a$ to hold the member 35 positively in its full opened position. The closing movement of the valve until the member 35 has been rotated again to the position shown in Fig. 2, as will be readily understood, is a reversal of the opening rotation, but when the pins 28 pass into the cam portions $b$, the shoulder 25 of the spindle will engage the upper ends of the levers 43 causing them to be swung on their pivots 44 in a direction opposite to the movement produced by the tapered faces 41 and 42, thus moving the valves 49 to closing position. The straight portions $b$ of the cam 24 are arranged to cause the valve seats 52 to be aligned accurately with the seats 53 during the final closing movement of the valves and the pins 28 engage directly with the slots 39 in the valve member 34 to positively hold the valve member in its proper position when the valve is closed. It will be noted that the construction and arrangement of the guides 50, 51 will insure a movement of the valve seats 52 normally to the faces of the seats 53 and which together with the spherical shape of the enlarged ends 46 and the engagement thereof with the valves 49 at their axis will insure a perfect closing of the valve.

It will also be noted that the construction and mounting of the valve member 35 and valves 49 is such that the member 35 is supported upon an axis passing through its center of gravity whereby the force required for the movement of the parts is reduced to a minimum, and furthermore, when the valve is in the partially opened condition the pressure of the fluid passing into and through the valve casing will be balanced on all parts of the valve member 35 in such a manner that the rotation of said member, either towards or from its fully opened position will not be resisted by such pressure.

I claim:

1. A valve of the type having a valve casing provided with an inlet and an outlet, a valve carrying member rotatably mounted in said casing and provided with a conduit adapted when the valve is in its fully opened position to provide a direct communication between said outlet and inlet, valves carried by said member, a spindle projecting outwardly of, and connected with, said casing for rotatable and longitudinal sliding movement relatively thereto for actuating said member and valves; characterized by the provision of means non-rotatably secured to the valve casing and cooperating with said spindle for positively guiding said valve carrying member in all of its positions of movement.

2. A valve of the type having a valve carrying member rotatably mounted within a casing having an inlet and an outlet, valves for closing said inlet and outlet mounted on said member, said member being provided with a cylindrical conduit, and a spindle projecting outwardly of, and connected with said casing for rotatable and longitudinal sliding movement relatively thereto for rotating said member to either of two positions in one of which said valves are aligned with said inlet and outlet and in the other of which said conduit furnishes communication between said inlet and outlet; characterized by the provision of interlocking means non-rotatably secured to said valve casing and co-operating with said spindle for positively holding said valve carrying member in either of said positions.

3. A valve of the type having a valve carrying member rotatably mounted within a casing having an inlet and an outlet, valves for closing said inlet and outlet mounted on said member, said member being provided with a cylindrical conduit and a spindle projecting outwardly of, and connected with said casing for rotatable and longitudinal movement, for rotating said member to either of two positions, in one of which, said valves are aligned with said inlet and outlet, and in the other of which, said conduit furnishes communication between said inlet and outlet; characterized by the provision of means carried directly by said spindle and non-rotatably engageable directly with said valve carrying member to lock said member in the first mentioned of said positions.

4. In a valve, a casing, a spindle connected with said casing for longitudinal and rotative movement and projecting outwardly thereof, a combined valve carrying member and conduit rotatively mounted in said casing and connected with said spindle, valves carried by said member, means for raising and lowering said spindle and co-operating means connected directly with said spindle and with said casing for causing the longitudinal movement of said spindle to produce a rotation thereof and move said valve carrying member upon its axis.

5. In a valve, a casing, a spindle carried thereby for longitudinal and rotative movement and projecting outwardly thereof, a combined valve carrying member and conduit mounted for rotation within said casing and in engagement with said spindle, means carried directly by said spindle, and co-operating means in engagement with said first named means and connected with said casing for causing rotation of said spindle and member.

6. In a valve, a casing, a member mounted within said casing and fixedly secured thereto, said member being provided with cam surfaces, a spindle mounted upon said casing for longitudinal and rotative movement and projecting outwardly thereof, means connected with said spindle for causing longitudinal movement thereof, a combined valve carrying member and conduit carried by said spindle and mounted for rotation within said casing, valves carried by said last-mentioned member, and means fixedly secured to said spindle and engaged with said cam surfaces for causing the longitudinal movement of said spindle to produce rotation of said member.

7. In a valve, a casing, a member mounted within said casing and fixedly secured thereto, said member being provided with cam surfaces, a spindle mounted upon said casing for longitudinal and rotative movement, a combined valve carrying member and conduit in engagement with said spindle, and mounted for rotation within said casing, valves carried by said last-mentioned member, means fixedly secured to said spindle and engaged with said cam surfaces for causing the longitudinal movement of said spindle to produce rotation of said valve carrying member, and other means carried by said spindle for actuating said valves.

8. In a valve, a casing, a member mounted within said casing and fixedly secured thereto, said member being provided with cam surfaces having a curved central portion merging at each end with a straight portion, a spindle projecting outwardly of, and mounted upon said casing for longitudinal and rotative movement, a combined valve carrying member and conduit in engagement with said spindle, and mounted for rotation within said casing, valves carried by said combined member at right angles to said conduit and means carried directly by said spindle and co-operating with the curved portion of said cam surfaces to produce a limited rotation of said spindle and valve carrying member and co-operating with the straight portions of said cam surfaces to lock said spindle and valve carrying member against rotation at either end of their rotational movement.

9. In a valve, a casing, a spindle carried thereby for rotative and longitudinal movement, a combined valve carrying member and conduit non-rotatably connected with said spindle, valves and valve actuating levers carried by said member, and means fixedly secured to said spindle to form therewith a rigid substantially integral structure adapted to engage directly with said levers and cause actuation of the valves.

10. In a valve, a casing, a spindle carried thereby for rotative and longitudinal movement, a combined valve carrying member and conduit in engagement with said spindle, valves and valve actuating levers carried by said member, said spindle being provided with wedge shaped faces for actuating said levers to open said valves and a shoulder upon said spindle for actuating said levers to close said valves.

11. In a valve, a casing including a bonnet secured thereto, a spindle mounted upon said bonnet for rotative and longitudinal movement, a spider having an annular flange secured between and forming a gasket between said bonnet and casing, said spider having a hollow boss projecting from said flange and encircling said spindle, said boss being provided with cam surfaces, means carried by said spindle in engagement with said cam surfaces for causing the longitudinal movement of said spindle to produce a limited rotation thereof, a combined valve carrying member and conduit in engagement with said spindle and mounted for rotation within said casing, valves and valve actuating levers carried by said member, and means fixedly secured to said spindle for actuating said levers.

12. In a valve, a casing provided with an inlet and an outlet, a valve carrying member rotatably mounted within said casing, said member being provided with a cylindrical conduit, valves movably mounted on said member, and a spindle connected to said casing for longitudinal and rotative movement, said spindle being further non-rotatably and slidably associated with said member, and adapted to rotate said member to either of two positions, in one of which, said valves are aligned with said inlet and outlet, and in the other of which, said conduit furnishes communication between said inlet and outlet; said spindle and member being provided with interlocking means constructed and arranged to be brought into engagement when said member is moved to the first of said mentioned positions to hold said member positively against further rotation.

In testimony whereof I have hereunto set my hand.

KARL MARSCHEIDER.